US006380952B1

(12) United States Patent
Mass et al.

(10) Patent No.: US 6,380,952 B1
(45) Date of Patent: Apr. 30, 2002

(54) SYSTEM FOR CONTINUOUS DISPLAY AND NAVIGATION IN A VIRTUAL-REALITY WORLD

(75) Inventors: Yossi Mass, Ramat Gan; Amir Herzberg, Ramat Efal, both of (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/273,767

(22) Filed: Mar. 22, 1999

(30) Foreign Application Priority Data

Apr. 7, 1998 (EP) .............................. 98480020

(51) Int. Cl.⁷ ............................................. G06F 15/00
(52) U.S. Cl. ........................................ 345/757; 345/850
(58) Field of Search ................................ 345/757, 782, 345/836, 848, 850, 852, 653, 679, 664, 851; 707/10

(56) References Cited

U.S. PATENT DOCUMENTS

| | | | |
|---|---|---|---|
| 5,555,354 A | * 9/1996 | Strasnick et al. | ............ 345/653 |
| 5,689,628 A | * 11/1997 | Robertson | .................... 345/653 |
| 5,883,628 A | * 3/1999 | Mullaly et al. | ............. 345/758 |
| 5,999,208 A | * 12/1999 | McNerney et al. | ............ 348/15 |
| 6,111,578 A | * 8/2000 | Tesler | .......................... 345/853 |
| 6,219,045 B1 | * 4/2001 | Leahy et al. | ................. 345/758 |

OTHER PUBLICATIONS

Fisher Et Al, "Stereoscopic Displays and Virtual Reality Systems," *IS & T—Society for Imaging Science And Technology*, San Jose, Ca., 1994.*
Regan Et Al, *A Low Latency Virtual Reality System*, Clayton, Vic., Australia, 1992.*
Iovine, *Step Into Virtual Reality*, McGraw–Hill, N.Y., 1995.*

* cited by examiner

*Primary Examiner*—Steven Sax
(74) *Attorney, Agent, or Firm*—McGuireWoods LLP; Louis J. Percello

(57) ABSTRACT

System for continuous display and navigation in a virtual reality world comprising display means, a server, a computer including browsing means for communicating with the server, storage means for storing a plurality of files defining three dimensional virtual spaces which can be displayed on display means on request of browsing means, and virtual reality managing means for, upon receiving coordinates of the current viewpoint of the user from browsing means, directly requesting to server appropriate files, the selection of which is based on an evaluation of which three-dimensional virtual space will be most needed and loading these files into browsing means for displaying this three-dimensional space.

9 Claims, 2 Drawing Sheets

SYSTEM FOR CONTINUOUS DISPLAY AND NAVIGATION IN A VIRTUAL-REALITY WORLD

TECHNICAL FIELD

The present invention relates generally to virtual reality worlds wherein the user can navigate in the three-dimensional space which is continuously displayed and in particular to a system for continuous display and navigation in a virtual reality world.

BACKGROUND

Virtual reality worlds with three-dimensional spaces are used in many applications such as virtual electronic malls, dungeon and dragon games, etc. In such worlds, the three-dimensional description of objects and space takes substantial size in the system storage, which size causes delay upon loading of a three-dimensional, virtual reality space when needed.

The tools currently used in the virtual reality applications are browsers using the Virtual Reality Modeling language (VRML). This language defines the nodes Anchor, Inline and Lod. Anchor is hyperlink to another space which can apply to large spaces but not in a continuous way. Inline allows to embed continuous three-dimensional spaces but not large ones and Level of Details (LOD) is a mechanism to load spaces according to distance of the viewer from them. The problem with such tools is that the whole world must be loaded in advance, which is not possible for very large spaces due to network bandwidths, memory limitations and computation power.

Another system, Portal and Zones, is a trial to give a robust solution to continuous navigation by dividing the universe into boxes and loading the next box as the user gets close to it. The problem is that such a system requires prior analyze of the whole space to find the division into boxes.

Therefore, there is a need for a continuous navigation as opposed to the standard solution today which is to define hyperlinks between parts of the world, loading each part upon entering it, which causes delay and discontinuity in the space.

SUMMARY OF THE INVENTION

Accordingly, the object of the invention is to provide a system allowing continuous navigation in large three-dimensional spaces by incrementally loading elements of the virtual reality, attempting to load elements prior to their use, by anticipating the movements and actions of the participants in the world.

Therefore, the invention relates to a system for continuous display and navigation in a virtual reality world comprising display means, a server, a computer including browsing means for communicating with the server and storage means for storing a plurality of files defining three-dimensional spaces which are displayed on request of the browsing means. The computer further comprises virtual reality managing means for, upon receiving coordinates of the current viewpoint of the user from the browsing means, directly requesting to the user appropriate files the selection of which is based upon on an evaluation of which three-dimensional space will be most needed and loading these appropriate files into the browsing means for displaying the three-dimensional space.

According to an important characteristic of the invention the virtual reality managing means include means for allocating a particular part of a first three-dimensional virtual space such as a virtual hallway to be used as element of combination of the first three-dimensional virtual space with at least a second three-dimensional space and means for adjusting either or both of first and second three-dimensional virtual spaces when they are combined thereby achieving an illusion of one continuous space.

BRIEF DESCRIPTION OF THE FIGURES

The objects features and other characteristics of the present invention will be more readily understood in conjunction with the accompanying drawings in which.

DETAILED DESCRIPTION OF THE INVENTION

Figure 1:
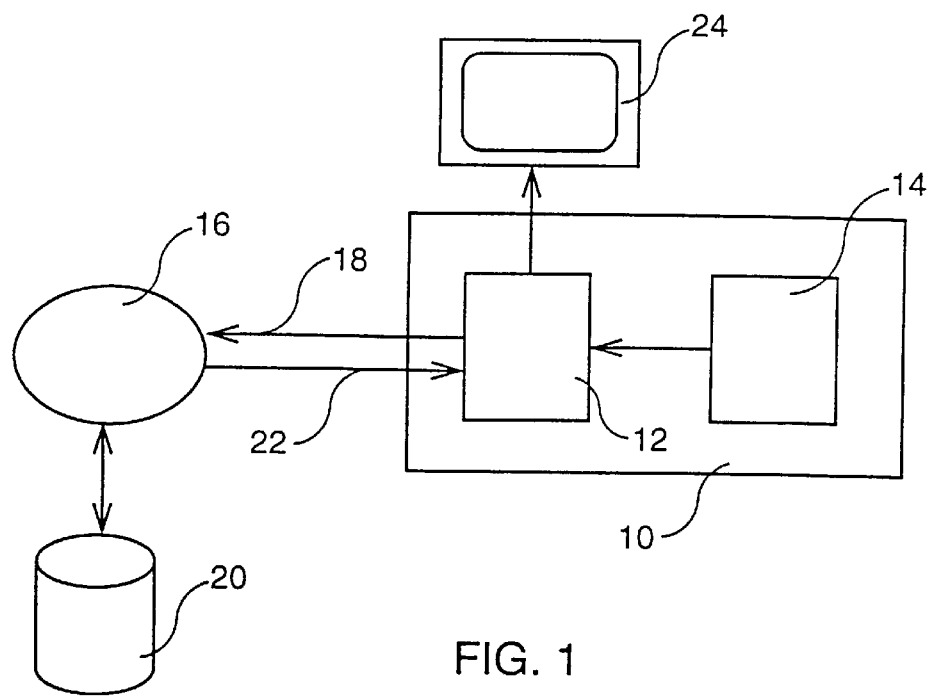
FIG.1 represents a block-diagram of a prior art system for navigating in a three-dimensional virtual reality world.

A prior art system for navigation in a three-dimensional virtual reality world illustrated in FIG. 1 comprises a computer 10 which includes a browser program 12 and helper applications 14. Browser program 12 communicates with a server 16 and requests to it a particular space when needed on line 18. The server 16 transfers the requested series of files which are stored in storage 20 to browser program 12 on line 22. Browser program 12 displays some of these files on display 24 and uses helper applications 14 to display the rest of the files. It must be noted that the term <<display>> used in this description includes also playing audio (music, voice) from a file etc., all according to the specific file and its format.

Figure 2:
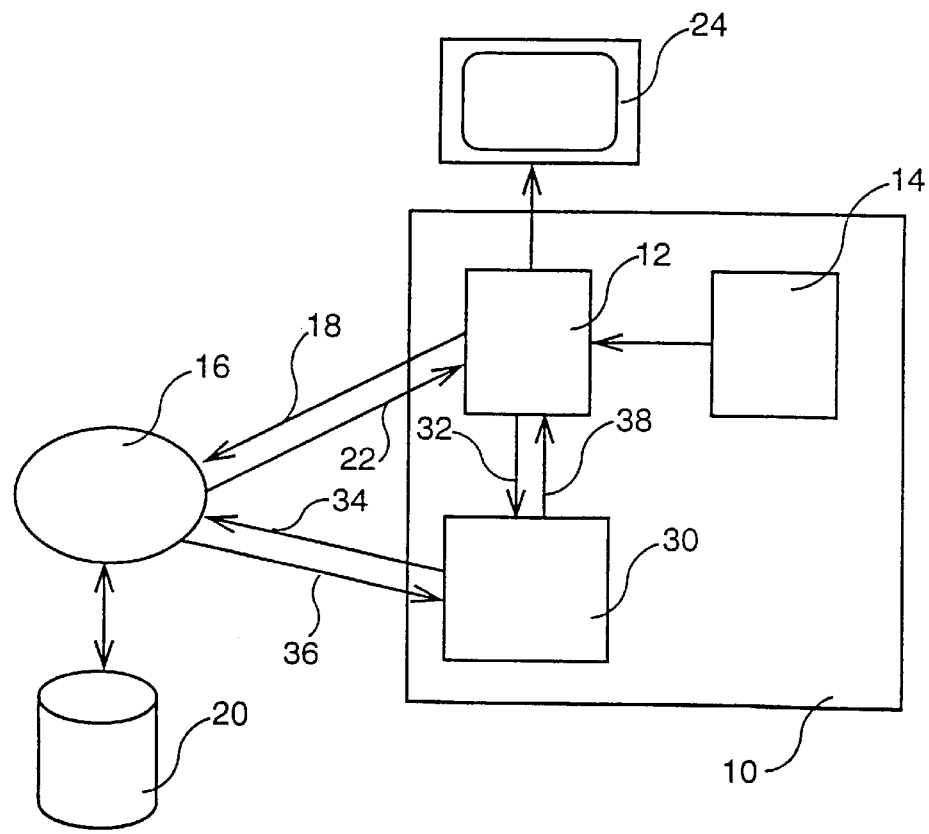
FIG. 2 represents a block-diagram of a preferred embodiment according to the invention enabling a continuous display and navigation in a virtual reality world.

A system according to the invention illustrated in FIG. 2 further uses a virtual reality manager 30 included in computer 10. Browser program 12 sends on line 32 to virtual reality manager 30 periodical coordinates of the current viewpoint of the user. Virtual reality manager 30 determines necessary files to be requested based upon an evaluation of which elements will be most needed and on to the properties of each element such as time to load or importance. These files are directly requested to server 16 on line 34, and server 16 transfers them from storage 20 to virtual reality manager on line 36. The files are then forwarded to browser program 12 on line 38.

The purpose of virtual reality manager 30 is to create an illusion of one continuous space and to mask any network delays by pre-loading the elements before the user should become aware of them. Virtual reality manager 30 may also gradually refine the details of elements as the user becomes closer, again trying to create a natural appearance of details appearing when the item is near. Virtual reality manager 30 may also discard elements due to space or processing overhead restriction, selecting the elements of minimal impact on the user (for example: furniture in a room whose door is closed).

In order to know in advance which elements are to be loaded, virtual reality manager 30 may use different mechanisms for predicting which elements will be most needed. These mechanisms are virtual, that is active elements of a virtual reality space which have specific behaviors and characteristics (such as shape). The preferred embodiment of the invention contains three of such mechanisms which are useful for the implementation of the virtual reality manager. These are a virtual door, a virtual auto-adjusting room and a virtual hallway.

Figures 3, 4:
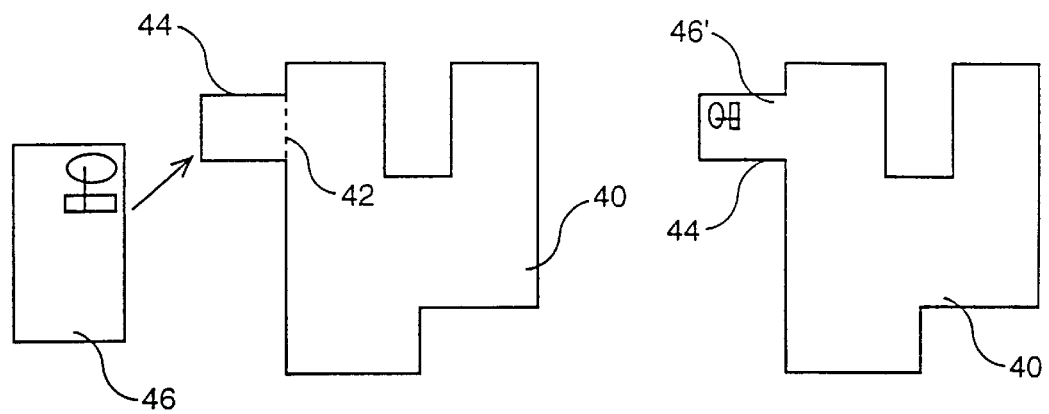
FIG. 3 represents schematically a three-dimensional virtual space and a virtual auto-adjusting room before the latter is incorporated in the virtual space.
FIG. 4 represents schematically the three-dimensional virtual space of FIG. 3 after the virtual auto-adjusting room has been incorporated therein.

As illustrated in FIG. 3, a three-dimensional space 40 which may be defined in any language such as Virtual Reality Modeling Language (VRML), can include a virtual door 42 represented by a dashed line. Such a virtual door consists of a sliding door and one or more sensors. The sensors define conditions under which it is likely that the user will want to pass through the door. An obvious sensor is a definition of a distance from the door, where the sensor is invoked whenever a user comes closer than this distance. Another kind of sensor can define an area such that the sensor is activated when the user enters the area.

A virtual door will normally use sensors for the following functions:
load elements behind the door when it is anticipated that the user may wish to pass (e.g. the user gets near),
open the door when the user becomes very close,
close the door when the user gets far, as in after exiting a room or shop,
possibly discard elements if the user gets far away and is not likely to re-enter room.

A virtual auto-adjusting room 44 is a designated part of a virtual space which is separated from the rest of that virtual space by one or more virtual doors such as virtual door 42. Room 44 cannot be entered unless the virtual door is opened. The room contains an address of some other virtual space 46 that should be loaded and fitted into it.

Assuming that separated virtual space 46 has to be virtual incorporated as auto-adjusting room 44, it is rotated and scaled by virtual reality manager 30 in order to fit the size of room 44 in virtual space 40. As illustrated in FIG. 4, virtual space 40 now contains virtual space 46' which results from virtual space 46 which has been rotated 90° and has a decreased size.

After virtual space 46' has been incorporated in virtual space 40, it becomes part of the current space enabling the user to navigate back and forth in a continuous way. It must be noted that the same space can be loaded into different rooms with different sizes in the same original virtual space.

Figures 5, 6:
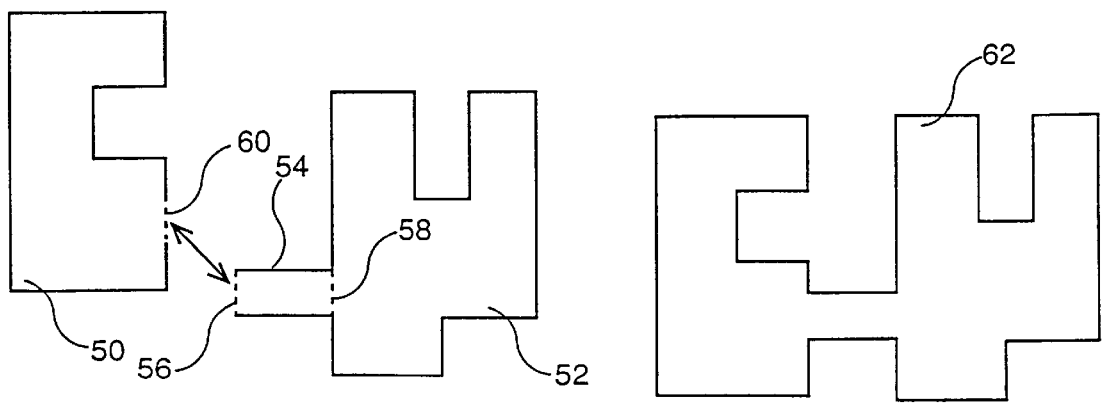
FIG. 5 represents schematically two three-dimensional virtual spaces before being connected together by a virtual hallway located in the fist virtual space.
FIG. 6 represents schematically a single three-dimensional virtual space resulting from the connection of the first and second three-dimensional spaces of FIG. 5.

FIG. 5 represents two virtual spaces 50, 52 with a virtual hallway 54. Such a virtual hallway is defined by a space with two virtual doors 56 and 58. The functions of such a virtual hallway are:
to allow continuous navigation from one virtual space to another space, while loading the spaces and the elements in them only as needed,
to allow smooth transition between the two virtual spaces, hiding possible conflicts between their three-dimensional representation,
to allow multiple virtual spaces to connect to the same virtual door, in a way that a user coming in from one virtual space would not be aware of the other virtual spaces connected to the door, in particular upon returning through the same virtual door.

In the example illustrated in FIG. 5, virtual space 50 and virtual space 52 are connected by connecting virtual door 56 of hallway 54 to virtual door 60 of space 50. For this, it is possible that virtual reality manager 30 has to rotate space 50 and to scale either or both virtual spaces (and the hallway). When the two virtual spaces have been connected, this results in a single virtual space 62 having the aspect illustrated in FIG. 6 wherein hallway 54 has been integrated into the new virtual space.

It must be noted that the virtual space 52 could include a plurality of virtual hallways such as hallway 54 so that a plurality of other virtual spaces such as space 50 could be connected to virtual space 52 in order to get a single continuous space.

The virtual hallway may be always loaded or loaded only when the user il likely to pass through it (e.g. when the user is near), using the mechanism of the virtual door. When getting close to the hallway's other door, the virtual space behind the hallway is loaded and adjusted such that its door is located at the door of the hallway. Then, the door is opened and the new virtual space is revealed.

Note that, unlike a virtual auto-adjusting room where the space at the other side of the virtual door is typically scaled to fit the size of the room, here the new space is loaded and located at the other end of the virtual hallway to form a continuous space.

The door such as virtual door 58 used to enter the hallway may be closed as the user gets further away from it, and then the space from which the user came and/or elements in it may be discarded if necessary for performance. Closing the door would also avoid conflicts between the geometries of the two virtual spaces in their three-dimensional representation. However, the hallway will retain the identity and state information of the first virtual space so as to return the user to the same space if he returns through the hallway.

In a typical scenario each of the virtual spaces to be connected by the virtual hallway may reside in different storage devices controlled by different servers, and more than one space can be connected to the same virtual door.

What is claimed is:

1. System for continuous display and navigation in a virtual reality world comprising display means (24), a server (16), a computer (10) including browsing means (12) for communicating with said server and storage means (20) for storing a plurality of files defining three-dimensional virtual spaces which are displayed on said display means on request of said browsing means;

said system being characterized in that said computer further comprises virtual reality managing means (30) for, upon receiving coordinates of the current viewpoint of the user from said browsing means, directly requesting to said server appropriate files, the selection of which is based on an evaluation of which three-dimensional virtual space will be most needed at a future time, and pre-loading said files into said browsing means for displaying said three-dimensional space.

2. System according to claim 1, wherein said virtual reality managing means (30) include means for allocating a particular part (44 or 54) of a first three-dimensional virtual space (40 or 52) to be used as element of combination of said first three-dimensional virtual space with at least a second three-dimensional space (46 or 50) and means for adjusting either or both of said first and second three-dimensional virtual spaces when they are combined thereby achieving an illusion of one continuous space.

3. System according to claim 2, wherein said particular part (44 or 54) of said first three-dimensional virtual space

(40) is separated from the rest of said first space by a first virtual door (42 or 58) and said second three-dimensional virtual space (46 or 50) is combined with said first three dimensional virtual space only when it is likely that the user will want to pass through said virtual door.

4. System according to claim 3, wherein said second three-dimensional virtual space is a virtual auto-adjusting room (46) and said virtual reality managing means (30) include means for rotating and scaling said virtual auto-adjusting room so that it can be integrated in said particular part (44) of said first three-dimensional virtual space (40).

5. System according to claim 3, wherein said first three-dimensional virtual space (52) contains a virtual hallway (54) which is a virtual space limited by said first virtual door (58) and a second virtual door (56), said second virtual door being connected to said second three-dimensional virtual space (50) when this one is combined with said first three-dimensional virtual space.

6. System according to claim 5, wherein said virtual reality managing means (30) include means for rotating said second three-dimensional virtual space (50) so that it fits to said first three-dimensional virtual space (52) and means for scaling either or both of said first and second spaces and said virtual hallway (54) so that said spaces can be combined and thereby giving the user the illusion of a continuous world.

7. System according to claim 3, wherein the appropriate files stored in said storage (20) and corresponding to said second three-dimensional virtual space (46 or 50) are requested by said virtual reality managing means (3) and loaded into said browsing means (12) only when determined conditions are sensed by said browsing means.

8. System according to claim 7, wherein said virtual reality managing means (30) include sensing means for sensing said determined conditions.

9. System according to claim 8, wherein said determined conditions include the condition that the user is within a predetermined distance from said virtual door (42 or 58) when navigating in said first three-dimensional virtual space (40).

* * * * *